(12) United States Patent
Grieff et al.

(10) Patent No.: US 7,644,168 B2
(45) Date of Patent: Jan. 5, 2010

(54) SAS EXPANDER

(75) Inventors: Thomas W. Grieff, Pinehurst, TX (US);
Robert C. Elliott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 11/180,145

(22) Filed: Jul. 13, 2005

(65) Prior Publication Data

US 2006/0101171 A1    May 11, 2006

Related U.S. Application Data

(60) Provisional application No. 60/625,655, filed on Nov. 5, 2004.

(51) Int. Cl.
*G06F 15/16* (2006.01)
*G06F 3/00* (2006.01)

(52) U.S. Cl. .................. 709/229; 709/225; 709/238; 709/250; 710/36; 710/316

(58) Field of Classification Search ............... 709/238, 709/250, 225, 229; 710/2, 36, 38, 316
See application file for complete search history.

(56) References Cited

U.S. PATENT DOCUMENTS 7,028,106 B2 *   4/2006   Foster et al. ................. 710/2
7,353,302 B2 *   4/2008   Seto ............................ 710/36

OTHER PUBLICATIONS

Evans, Mark "Serial Attached SCSI Architecture: Part 2—The SAS Link Layer" Maxtor, White paper, Dec. 2003, 6 pages.*

* cited by examiner

*Primary Examiner*—David Lazaro

(57) ABSTRACT

Systems and methodologies associated with providing additional functionality to a conventional SAS expander are described. One exemplary SAS expander embodiment includes logic for selectively performing source identifier checking for frames received at the SAS expander. The logic may also facilitate selectively performing explicit route checking for frames received at the SAS expander. In one example, the logic may also facilitate selectively providing VLAN-like services to devices connected to the SAS expander.

23 Claims, 9 Drawing Sheets

SAS EXPANDER

CROSS REFERENCE TO RELATED APPLICATIONS

This application claims the benefit of U.S. Provisional Application No. 60/625,655 filed Nov. 5, 2004.

BACKGROUND

Devices may be connected to other devices. The devices may include, for example, servers, operating systems, disks, volumes, and so on. Thus, "device", as used herein may refer to a physical (e.g., server, disk) and/or logical (e.g., operating system, volume) entity. There are different ways to connect devices (e.g., SCSI (small computer systems interface), ATA (advanced technology attachment)).

Another way to connect devices is using serial attached SCSI (SAS). The SAS specification defines an external connector and cabling system for box-to-box connections required by SCSI applications. Such point-to-point (P2P) configurations achieve high bandwidth but may require intermediary devices between initiator devices like servers and target devices like disks. Thus, the SAS specification defines an expander for use in the SAS environment. SAS expanders may function as the intermediary devices. These SAS expanders facilitate architecting systems in which a set of initiators (e.g., blade servers) may have a set of connections to a set of targets (e.g., disks).

SAS devices contain virtual constructs called ports. Ports include PHYs. A PHY includes a transceiver—a transmitter and a receiver—through which signals can be transmitted to and/or received from another PHY. A physical link attaches two PHYs together. SAS ports and SAS expanders have unique SAS addresses (e.g., 64 bit SAS address). Similarly, PHYs have unique identifiers. Thus, a port, as a virtual construct, may include groups of PHYs with the same SAS address that can be attached to another group of PHYs sharing an SAS address.

An end device is an SAS device that is not an expander device. Example end devices include a host bus adapter (HBA), a disk drive, a blade server, and so on. End devices may be connected directly to an HBA, in which case the number of SAS physical links available through the HBA limits the size of the SAS domain (e.g., 16 devices). Alternatively, end devices may be connected indirectly to an HBA through SAS expanders. In this way the potential size of an SAS domain can be increased (e.g., 16,000 devices).

A conventional SAS expander can be viewed as a switch having a set of ports and logic that implements part of an SAS protocol. The switch enables multiple point to point connections to be made from a single HBA enclosure and for multiple SAS devices to be aggregated into an SAS domain.

SAS expanders may be configured so that end devices (not SAS expanders) connecting to the SAS expanders may be either SAS devices or SATA (serial ATA) devices. The SAS expanders may be fan-out expanders and/or edge expanders. Generally, an SAS domain may include one fan-out expander and one or more edge expanders. A fan-out expander may connect to a maximum of 128 SAS devices which may include combinations of initiators, targets, and edge expanders. An edge expander may in turn be connected to a maximum of 128 SAS devices, which may include no more than one other expander. Thus, a fan-out expander connected to 128 edge connectors, each of which is in turn connected to 127 fan-out devices, would describe an SAS domain with over 16,000 devices.

Addressing such a large number of devices in an SAS domain may include using globally unique identifiers like worldwide names (WWN) for the SAS devices. Therefore, many SCSI devices come pre-configured with WWNs. When a system described by an SAS domain is being powered-on, the SAS devices in the system discover and establish connections with each other. During the discovery phase, WWNs may be exchanged so that the number and type(s) of devices connected in the SAS domain can be determined. As they are discovered, paths between initiators and targets may be stored, for example, in routing tables in SAS expanders. Conventionally, all initiators are given access to all targets.

SAS uses three different protocols to transport information. SSP (Serial SCSI Protocol) supports SCSI devices, drives, and so on. STP (Serial ATA Tunneling Protocol) supports ATA devices, drives, and so on. SMP (Serial Management Protocol) supports SAS expanders and manages SAS's point to point topology.

SAS protocols may be viewed as having four layers: a PHY layer, a link layer, a port layer, and a transport layer. An SAS port may implement these four layers. The transport layer encapsulates commands, data, status and the like into SAS frames (data packets) and assigns them to the port layer. The transport layer receives SAS frames from the port layer, extracts data from the frames, and sends the data to an application layer. The port layer receives packets from the transport layer and sends messages to the link layer. These messages may facilitate, for example, establishing connections. The port layer may also select PHYs through which frames may be transmitted. The port layer may also receive signals from the link layer and provide packets to the transport layer. The link layer facilitates controlling the PHY layer for connection management. The PHY layer includes hardware like transceivers that facilitate connecting to a physical interface and thus physically sending and/or receiving signals.

Conventionally, the SAS standard is functionally permissive and thus may facilitate connecting all sources to all targets. A conventional SAS expander may have no processor and little memory. Additionally, a conventional SAS expander may be configured to allow other devices to manipulate its memory, in particular a routing table located in the memory on the SAS expander. Thus, the SAS expander may have little, if any, ability to control (e.g., allow, prevent) certain devices from communicating with other devices, to facilitate isolating devices physically and/or logically, to provide basic security features, and the like.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DEFINITIONS

Figure 1:
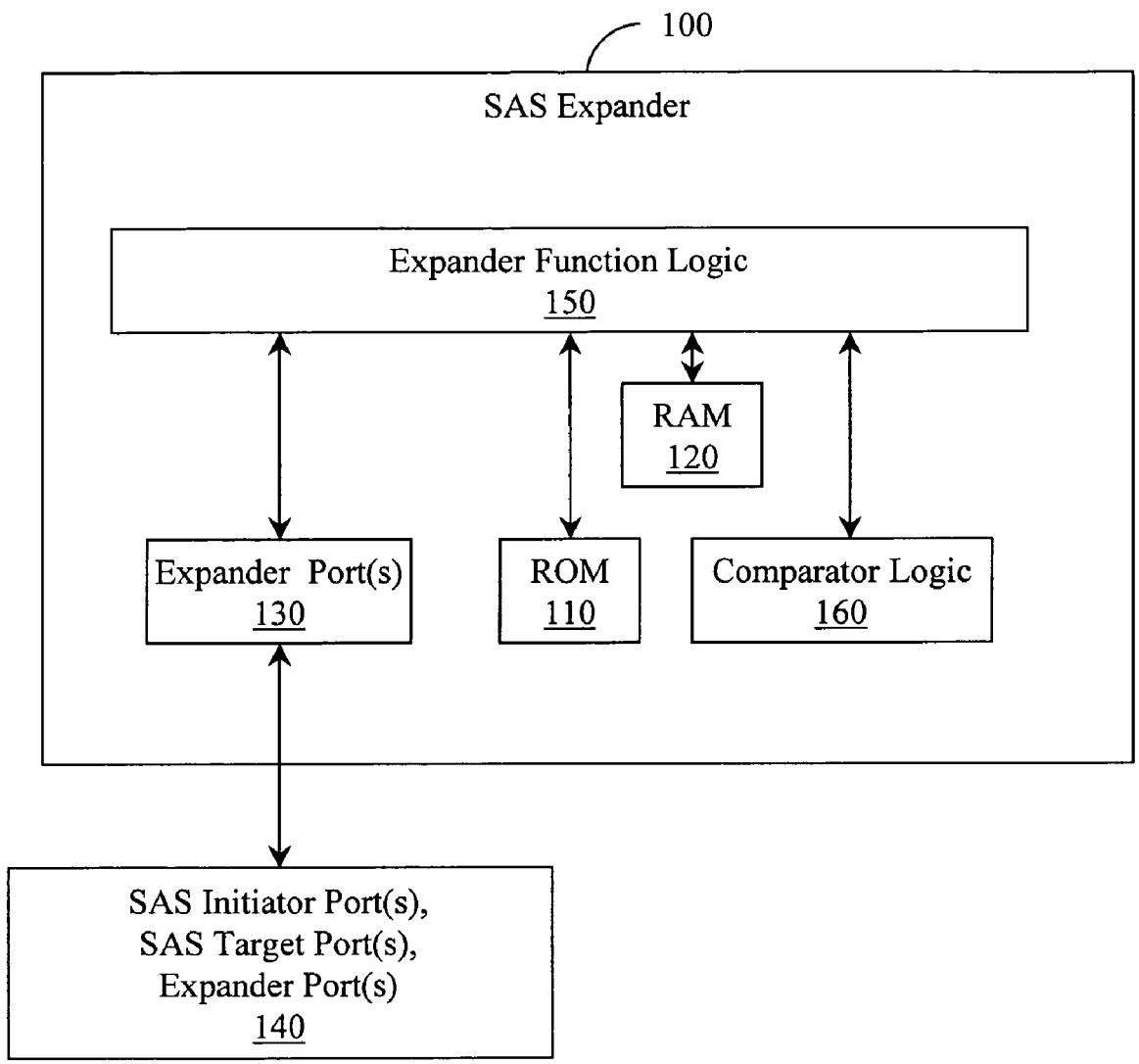
FIG. 1 illustrates an example SAS expander.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus in different examples may be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

DETAILED DESCRIPTION

Example SAS expanders described herein provide additional functionality not found in conventional SAS expanders. In one example, the additional services facilitate selectively controlling whether devices will be allowed to communicate through an SAS expander. The control may be exercised, for example, by source identifier checking and/or explicit route checking. The control may also facilitate providing services like those associated with a VLAN (Virtual Local Area Network). These services may in turn facilitate addressing security threats, easing server deployment, simplifying server management, and so on.

Example SAS expanders described herein may include an additional logic (e.g., processor) not found in conventional SAS expanders. The logic may be configured to facilitate controlling whether selected source devices will be allowed to communicate with selected target devices. The control may depend, for example, on source identifier checking, routing table verification, and so on.

Example SAS expanders may also include a memory. The memory may be configured to store, for example, routing rules, routing table information, and so on, that may be employed to store information that also facilitates controlling whether selected devices will be allowed to communicate with each other. In different examples the memory may include read only memory (ROM), random access memory (RAM), and/or registers.

In one example, the memory may include a ROM that stores data concerning ports and devices. By way of illustration, the ROM may store information concerning the degree to which a device associated with a port should be trusted and/or may store information like rules that facilitate determining the degree to which a device associated with a port should be trusted. For example, the ROM may store a rule that holds that a PHY connected to an end device is not to be trusted. Similarly, the ROM may store rules that hold that a PHY that does not support zoning should not be trusted, that a PHY located on the edge of a trusted region should be trusted, and so on.

Example SAS expanders may be used in environments where some communicating devices may operate incorrectly and/or mischievously and thus may require policing while other devices may be trusted. Therefore, example SAS expanders may be configured to facilitate separating PHYs into two categories (e.g., A, B) and selectively providing different processing for messages received from PHYs in the different categories.

Messages received from PHYs in a first category (e.g., A) may be subjected to additional processing over and above that provided by conventional SAS expanders while messages received from PHYs in a second category (e.g., B) may experience conventional processing. A group A PHY may have different characteristics than a conventional PHY. For example, source identifier verification may be performed on group A PHYs, management commands received from group A devices may be sanitized (e.g., selectively honored), routing tables for group A PHYs may be initialized to discover only an attached SAS expander and SAS domain components that are not end devices, communication requests from a group A PHY may be subjected to explicit route checking, and so on.

Group A PHYs may be "marked" so that communications from group A PHYs can be specially handled (e.g., sanitized, trusted). One mechanism for marking a group A PHY is to set a pre-defined value in a frame field (e.g., compatible features field, byte 20 in OPEN ADDRESS frame) that will identify the frame as coming from a group A PHY. This marking facilitates selectively applying more scrutiny (e.g., stricter filtering policy) to frames from group A PHYs than conventional SAS protocol dictates.

Group A PHYs may not have visibility into an entire SAS domain. Rather, they may only be allowed to make a connection with certain end devices. When the route is approved, SAS components in the explicit route path may be exposed to the group A PHY, which may then update its routing table.

Example SAS expanders have routing tables. The routing tables may be stored, for example, in a RAM on the SAS expander. An SAS discovery process facilitates populating the routing tables so that routes between devices are known. Conventionally, no routes are off limits in an SAS domain. If a device knows the address of another device it may attempt to communicate with that device. Also conventionally, an entire route linking two devices may be discoverable or visible to an SAS device.

In conventional SAS expanders, routing tables may be configured by external processors. In example systems described herein, an SAS expander may have a processor and be configured to permit only the on-board processor to do routing table configuration. The on-board processor may receive instructions from an off-board trusted supervisory processor. However, the SAS expander may be configured to only honor instructions received through certain ports/PHYs. These ports/PHYs can be identified, for example, in an additional boot ROM (read only memory).

The discovery process may be controlled, at least in part, by a management application client in an end device or expander device. An SAS expander may be located in an enclosure having a management processor that is configured to coordinate discovery and/or route management. The management processor may also be configured to support establishing a secure connection to a global management entity associated with the SAS domain. The management processor may therefore be configured to translate management directives from the global management entity into commands specific to an SAS expander. In one example, a management processor associated with an SAS expander may be involved in discovery and routing table manipulation. The management processor may, for example, manage broadcast change notifications received as devices in an SAS domain are powered on and become available. The management processor may also take actions like signaling an asynchronous event notice to an external manager.

During an SAS domain discovery process, an SAS domain may be probed one level at a time. When SAS expanders with configurable routing tables are found, tables in the SAS expanders may be manipulated (e.g., populated, updated). Example SAS expanders described herein may be self-configuring and thus will not allow outside processors, except trusted supervisor processors, to manipulate their routing tables. Conventional SAS expanders would allow any outside logic to manipulate their routing tables and would not be acceptable for this environment.

In one example discovery process, for non group A PHYs, the discovery process will be conventional SAS discovery. For group A PHYs, a discovery request will expose the presence of a PHY, but will not expose end devices associated with the PHY. Thus, an SAS expander may enumerate its PHYs but will not expose attached devices to group A PHYs until explicit routes are requested and approved.

In one example power-up scenario, an SAS expander may default a PHY to a "non-route" condition (e.g., do not allow routing through the PHY) by manipulating a routing table. Thus, the PHY may not be useable as part of certain routes between sources and targets. Similarly, when repairing a link after a loss of link, an SAS expander may re-examine the stored IDENTIFY frame contents for consistency. If the SAS expander determines that the original device is re-attaching after the loss of link, then previously established routes may be re-enabled. However, if the SAS expander determines that a different device is attaching after the loss of link, then default values and routes may not be re-established. These may be retrieved, for example, from an on-board ROM.

In addition to power-on discovery, devices may be added and/or removed from a domain after discovery. The devices may be permanently and/or temporarily added/removed (e.g., powered down, powered up). Thus, when a device is added to or removed from an operating SAS domain, a notification signal(s) may be sent to members of the SAS domain so that they may adapt to the new configuration. In some examples, these additions and/or removals may affect routing tables in an SAS expander.

In an environment where clients may share infrastructure (e.g., disks, processors, operating systems) but not data, protecting (e.g., isolating) client data may be desirable. One way to protect client data is to implement source identifier checking. Source identifier checking facilitates controlling whether a connection is made between devices. A connection is a temporary association between an initiator PHY and a target PHY.

When an SAS device powers up or becomes available, it may generate an IDENTIFY frame and distribute that IDENTIFY frame to its neighbors. The IDENTIFY frame will be sent out via PHYs on the SAS device. The IDENTIFY frame may include a unique identifier (e.g., WWN) associated with the SAS device powering up. When the IDENTIFY frame is received at a neighbor, the unique identifier (e.g., WWN) associated with the device generating the IDENTIFY frame can be extracted and stored. Since the request will be received in a neighbor through a PHY, the unique identifier may be stored (e.g., in a source identifier register associated with the PHY). From there on, when other communications are received at that PHY, the source identifier in the subsequent communications can be compared against the source identifier provided in the initial IDENTIFY frame. If they match, processing may continue. If they do not match, then an exception may be generated.

In some examples, if source identifier checking indicates an undesired situation like the WWN in the IDENTIFY frame and the WWN in the OPEN ADDRESS frame not matching, then an asynchronous event notification can be sent to a deployment manager to warn against attempted "spoofing". This facilitates preventing imposters (e.g., "spoofers") from establishing and using routes. Spoofing is a technique used by errant processes to attempt to gain unauthorized access to a computer. When spoofing, a would-be intruder may send messages to a computer and indicate that the message is coming from a trusted host.

As described above, an SAS expander may create a route table based, at least in part, on information received from its neighbors and their neighbors during discovery. The routing table may be manipulated by the SAS expander and/or by a trusted supervisor. The SAS expander may be configured to selectively allow communications between devices based on the route table, rules stored in the ROM, and so on. A communication between devices may include a source identifier and a destination identifier. When a request (e.g., frame) to communicate with a device identified by a destination identifier is received from a device identified by a source identifier, the routing table may be consulted to determine whether this SAS expander is configured to allow this source to communicate with this destination through this SAS expander. If the communication is allowed, then the request may be forwarded to the destination. The source device may also be provided with data that exposes to the source device the end to end route to the destination device. Thus, the source device may be able to update its routing tables and/or other on-board information. Conventionally, this information may have been exposed during discovery. Example SAS expanders described herein may only expose such information after an explicit routing decision has been made.

Explicit route checking may be selectively applied. For example, devices communicating through a group A PHY may have their source identifiers and destination identifiers checked while devices communicating through a group B PHY may be processed according to conventional SAS destination based routing (e.g., no route checking). Explicit route checking facilitates mitigating damages associated with a denial of service (DoS) or a degradation of server (DgoS) attack. For example, a host may bombard a target with requests and produce an effective performance degradation. An example SAS expander can be configured to selectively eliminate a nuisance route to facilitate controlling access to a target by a bombarding source. In one example, the availability of a trusted supervisor may facilitate responding to a DoS attack and/or a misbehaving initiating device. As described above, a target may be bombarded with requests from an initiator. An SAS expander can be configured to recognize this situation and to alert its trusted supervisor. The trusted supervisor may then manipulate a routing table(s) in an SAS expander(s) to block the route by which the undesired onslaught of requests is being delivered.

Different explicit route checking strategies may be available. In one example, when a communication reaches a source SAS expander (e.g., the first SAS expander upstream of the device), the SAS expander may decide whether the communication will ultimately be allowed and thus decide whether to forward the communication. In another example, when the communication reaches a target expander (e.g., the last SAS expander before the target device), the expander may decide whether the communication will be allowed and decide whether to forward the communication. In both examples, the expanders are self-configuring expanders and the domain will include only self-configuring expanders.

Each expander PHY may have an expander routing attribute. The routing attribute facilitates determining routing methods the SAS expander will use with each PHY. A direct routing attribute leads to routing requests to an attached SAS port through the PHY. A table routing attribute leads to routing requests that have a match in the routing table through the PHY. A subtractive routing attribute leads to routing unresolved requests through the PHY.

Example SAS expanders may be configured to facilitate port based zoning. Rules may facilitate implementing port based zoning. For example, one rule may hold that PHYs in untrusted groups are to be associated with certain zones. Thus, PHYs may also be associated with group identifiers. Another rule may dictate that PHYs that touch end devices, either sources or targets, are to receive special attention when routing requests are made. In port based zoning, expanders can be configured so that only certain PHYs can talk to other PHYs based on group membership and/or group proximity. Thus, another rule may concern making routing and/or access decisions based on group membership and/or group proximity. In one example, SAS expanders may have flat address maps and rules concerning connections that can be made.

A LAN (local area network) can be regarded as a broadcast domain where hubs, bridges, switches and so on in the same physical segment(s) connect end node devices. End nodes in the LAN therefore communicate with each other without using a router. Communications with other devices located on other LAN segments traverse a router. However, routers add latency by examining additional fields in a data packet to determine destinations and routes.

A VLAN is a virtual local area network, where some of the "networking" may be done in software rather than in hardware. Thus, a VLAN may be regarded as a group of devices on different physical LAN segments that can communicate with each other as though they were on the same physical LAN segment. A VLAN facilitates providing independence from the physical topology of a network by allowing physically diverse sets of devices, physical and/or logical, to be logically connected within a single broadcast domain. Additionally, a VLAN facilitates providing enhanced security when compared to a shared media network environment since frames will only be delivered to intended recipients and broadcast frames will only be delivered to other members of the VLAN.

Example SAS expanders may be configured to provide VLAN-like services. For example, an SAS expander may facilitate managing and isolating SAS traffic. Conventional SAS expanders do not facilitate isolating operating systems or partitioning storage traffic because they allow all attached devices to communicate with all other attached devices. Using data from SAS traffic like IDENTIFY frames and OPEN ADDRESS frames, example SAS expanders can grant and/or revoke certain network-like privileges in software. By way of illustration, example systems may facilitate controlling whether an end device is allowed to reset PHYs in a system, whether a PHY may be allowed to delete RAID sets, whether a PHY can carve out logical units, and the like.

FIG. 1 illustrates an example SAS expander 100. SAS expander 100 may include and/or be operably connected to a read only memory (ROM) 110 that is configured to store a static data that is configured to facilitate explicit route checking. The static data may be, for example, a routing rule, a pre-configured path, and the like. A routing rule may describe, for example, specific pairs/sets of devices that are or are not allowed to communicate, types of devices that are or are not allowed to communicate, and so on. When a request (e.g., OPEN ADDRESS frame) is received at SAS expander 100, the routing rule may help determine whether the requested access will be granted or denied.

SAS expander 100 may also include and/or be operably connected to a random access memory (RAM) 120 that is configured to store a dynamic data that is configured to facilitate explicit route checking. The dynamic data may be, for example, a routing rule, a routing table, and the like. While a single routing table is described, it is to be appreciated that in different examples an SAS expander may have one routing table and/or a set of routing tables. In one example, the routing table may be configured by the SAS expander 100 while in another example the SAS expander may allow outside entities like a trusted supervisor to manipulate the routing table. The routing table is typically initialized during SAS discovery, however it may be dynamic data that is updated as devices are added and/or removed from an SAS domain. Similarly, routing rules stored in RAM 120 may be updated over time as devices migrate around a domain, new types of devices are added/removed, and so on.

In one example, the routing table may only be configurable by SAS expander 100. In another example, SAS expander 100 may be configured to only discover attached expanders and non-end devices during SAS discovery. Thus, an entire route from an initiator to a target may not be exposed to the devices and/or SAS expander 100 at discovery time. Later, when a route has been approved, the route may be exposed to devices connected via SAS expander 100. In another example, the routing table may be configurable by SAS expander 100 and/or a trusted supervisor (e.g., management processor) that is operably connected to SAS expander 100 through a pre-determined, trusted PHY or other sideband mechanism (not shown).

SAS expander 100 may also include an SAS expander port 130 that is configured to communicate with other ports 140. These other ports may include, for example, an SAS initiator port, an SAS target port, another SAS expander port, and so on. SAS expander 100 may communicate with these other ports 140 through an SAS connector and an SAS cable. The communication may be carried out according to protocols including, for example, a serial SCSI protocol (SSP), a serial ATA tunneling protocol (STP), and a SCSI management protocol (SMP).

SAS expander port 130 may include PHYs that can be logically configured into different PHY categories. As described above, different PHY categories may be associated with different types of processing in SAS expander 100.

SAS expander 100 may also include a comparator logic 160 that is configured to store source identifiers and thus to facilitate source identifier checking. In one example, comparator logic 160 may be configured to store a first unique source identifier presented to SAS expander 100 in a first communication. Comparator logic 160 may also be configured to selectively prevent a second communication from passing through SAS expander 100. The second communication (e.g., OPEN ADDRESS frame) may be prevented from passing based, at least in part, on whether a second unique identifier provided in the second communication matches the stored first unique source identifier. In one example, comparator logic 160 may include a comparison register allocated for each PHY in SAS expander 100.

SAS expander 100 may also include an expander function logic 150 that is operably connected to ROM 110, RAM 120, comparator logic 160, and SAS expander port 130. In one example expander function logic 150 may be implemented as a microprocessor executing processor executable instructions. Thus, expander function logic 150 may, for example, execute methods like those described in connection with FIGS. 5 and 6.

Expander function logic 150 may be configured to receive from an initiator device (e.g., server) a request for access to a target device (e.g., disk). The request may include data like a source identifier associated with the initiator device and a destination identifier associated with the target device. Thus, expander function logic 150 may be configured to selectively deny the initiator device access to the target device through the SAS expander port 130. The denial may be based, at least in part, on evaluating a route from the initiator device to the target device in light of the static data and the dynamic data. For example, a routing rule may indicate that the request should be honored/denied. Similarly, an entry in a routing table may indicate that the path from the initiator to the target is (un)acceptable.

Figure 2:
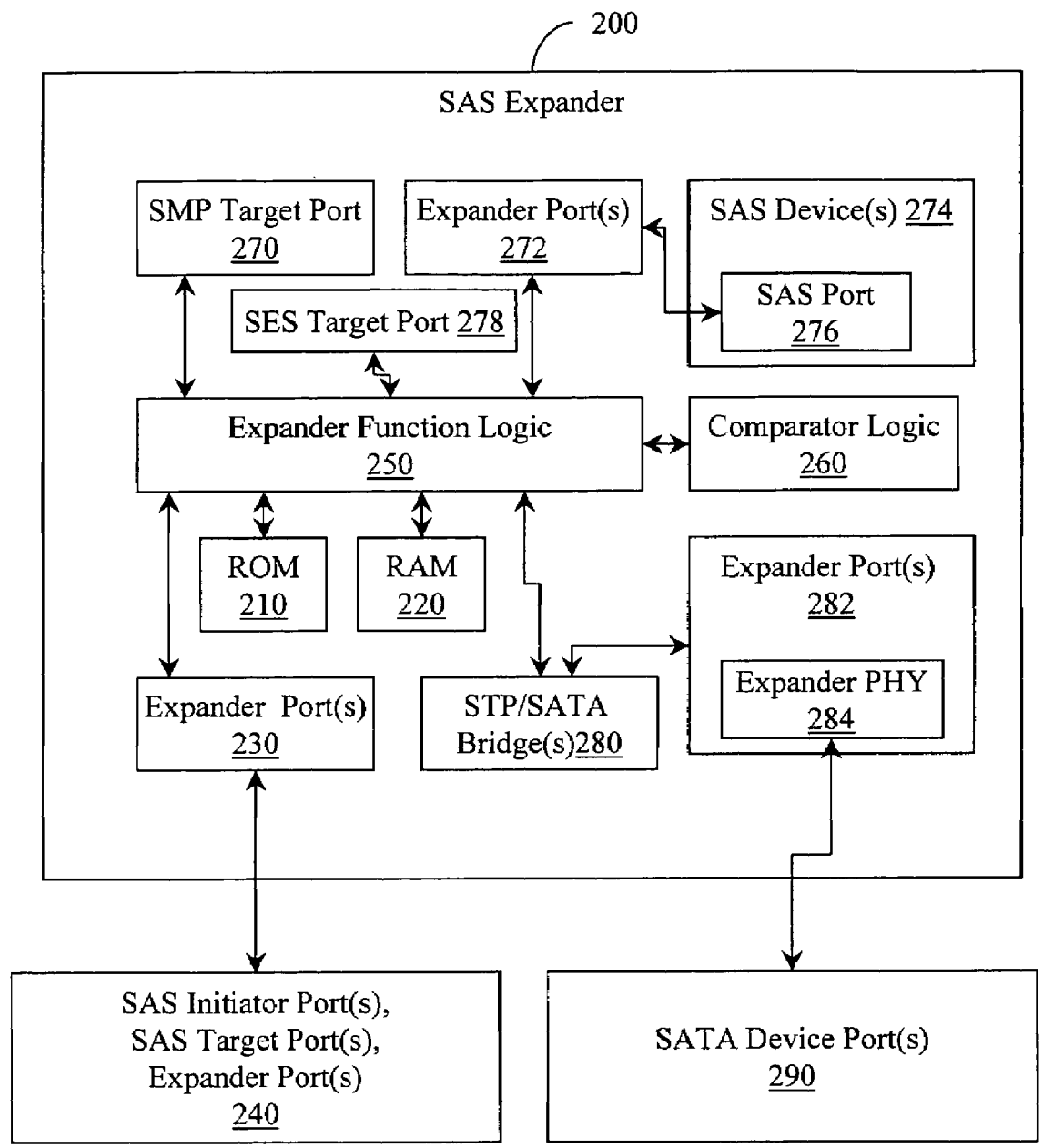
FIG. 2 illustrates another example SAS expander.

Since a goal of SAS is to bring SCSI and ATA together, FIG. 2 illustrates an SAS expander 200 that is similar to device 100 (FIG. 1). SAS expander 200 includes components 210, 220, 230, 250, and 260 that are analogous to components 110, 120, 130, 150, and 160.

Additionally, SAS expander 200 may include logic for communicating with SATA devices. For example, SAS expander 200 may include an STP/SATA bridge 280 and expander port(s) 282 that are configured with expander PHY(s) 284 for communicating with SATA device ports 290. Since SAS is configured to bridge between SCSI and ATA, expander 200 may support transport protocols like SSP, STP, and SMP.

Additionally, SAS expander 200 may include a SCSI management protocol (SMP) target port 270 that is operably connected to expander function logic 250 and a SCSI enclosure service (SES) target port 278 that is operably connected to expander function logic 250. Access to SCSI management protocol target port 270 and SCSI enclosure service target port 278 may be controllable, at least in part, by expander function logic 250. SAS expander 200 may also include an internal expander port 272. Expander port 272 may in turn provide access to SAS device(s) 274 through SAS port(s) 276.

Figure 3:
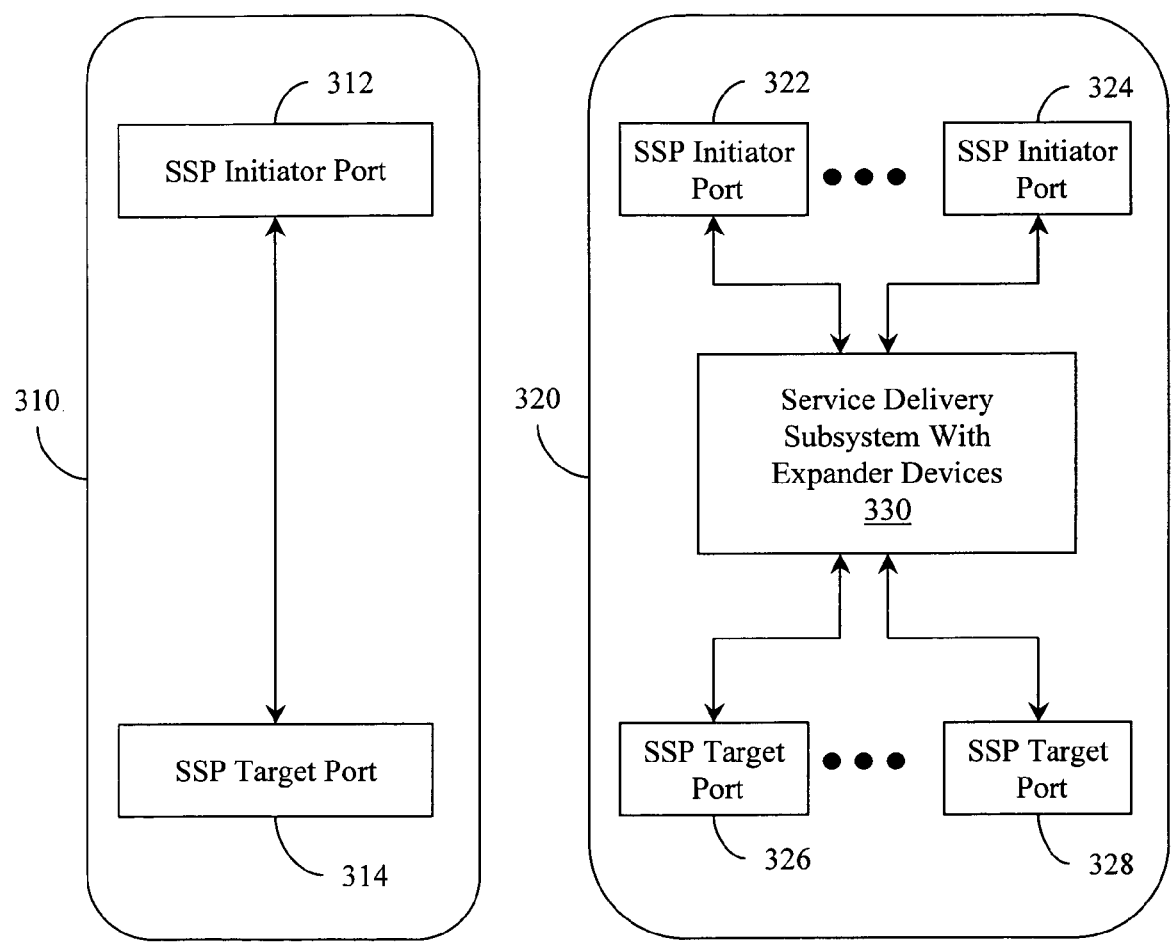
FIG. 3 illustrates two example SAS domains.

FIG. 3 illustrates two example SAS domains. In domain 310, there is simply an SSP initiator port 312 and an SSP target port 314. In domain 320, in addition to initiator and target ports there is also a service delivery subsystem 330 that includes SAS expanders. Thus, rather than a single SSP initiator port there may be a set of SSP initiator ports 322 through 324. Similarly, rather than a single SSP target port there may be a set of SSP target ports 326 through 328. As described above, to accommodate large numbers of devices, unique identifiers may be used. Thus, SAS expander 100 and/or SAS expander 200 may process source identifiers and destination identifiers that are SAS world wide names.

Figure 4:
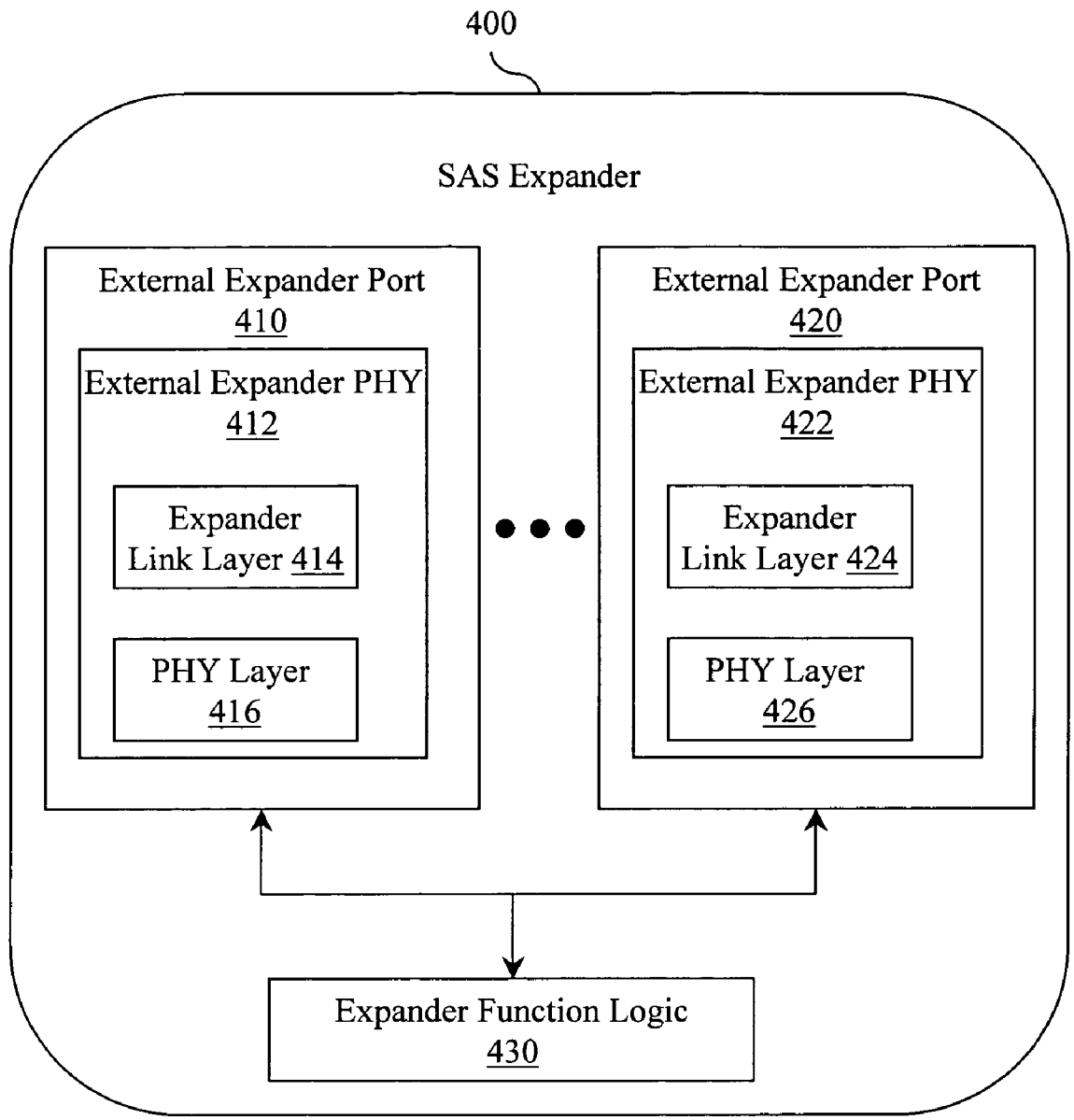
FIG. 4 illustrates an example SAS expander.

FIG. 4 illustrates an example SAS expander 400. SAS expander 400 is described from a different point of view than SAS expander 100 although they may be implemented similarly. SAS expander 400 includes a set of external expander ports 410 through 420. An external expander port (e.g., 410, 420) may include an external expander PHY (e.g., 412, 422). An external expander PHY (e.g., 412, 422) may in turn implement different layers of an SAS protocol like an expander link layer (e.g., 414, 424), a PHY layer (e.g., 416, 426), and so on. External expander ports 410 through 420 may be operably connected to an expander function logic 430 that participates in operations like source identifier checking, explicit route checking, providing VLAN-like services (e.g., isolation), and so on.

Thus, in one example, expander function logic 430 may be configured to selectively apply rules to requests received through a PHY (e.g., 412, 422). The rules may be applied, for example, upon detecting that a field in the received request matches a pre-defined value. In one example, the field may be byte twenty in an OPEN ADDRESS frame. While byte twenty in an OPEN ADDRESS frame is described, it is to be appreciated that other fields may be employed in marking a request as requiring rule application. The rules may be configured to control access to a target device. Thus, in one example, the rules may include port zoning rules. The port zoning rules may describe, for example, that a PHY that does not support zoning should not be trusted, that a PHY located on the edge of a trusted region should be trusted, and so on.

In another example, the rules may be applied based on the PHY through which the request is received. For example, a first PHY (e.g., 410) may be configured as a first type of PHY (e.g., group A) while a second PHY (e.g., 420) may be configured as a second type of PHY (e.g., group B). Thus, requests received through the first PHY may be treated differently than requests received through the second PHY. By way of illustration, expander function logic 430 and/or a comparator logic (not illustrated) may be configured to selectively perform explicit route checking, management command sanitizing, and source identifier checking based, at least in part, on whether a communication is received through a PHY of a first type.

A route from an initiator device to a target device may include multiple SAS expander devices. Thus, there are different locations at which explicit route checking may be performed. In one example, explicit route checking may be performed at a first SAS expander upstream from an initiator device. In another example, explicit route checking may be performed at a last SAS expander before a target device. While first and last SAS expanders are described, it is to be appreciated that in other examples explicit route checking may be performed at other locations.

As described above, there may be multiple SAS expander devices between an initiator device and a target device. Additionally, an SAS domain may include a large number of SAS devices and SAS expander devices. Also as described above, during discovery these devices and expander devices may communicate with each other so that the SAS domain topology may be learned. However, some devices may be configured to not receive and/or store complete information about routes between initiators and targets. Thus, in one example, expander function logic 430 may be configured to expose to an initiator device and/or to SAS expander 400 all devices in a route from the initiator device to a target device upon granting the initiator device access to the destination device.

Figure 5:
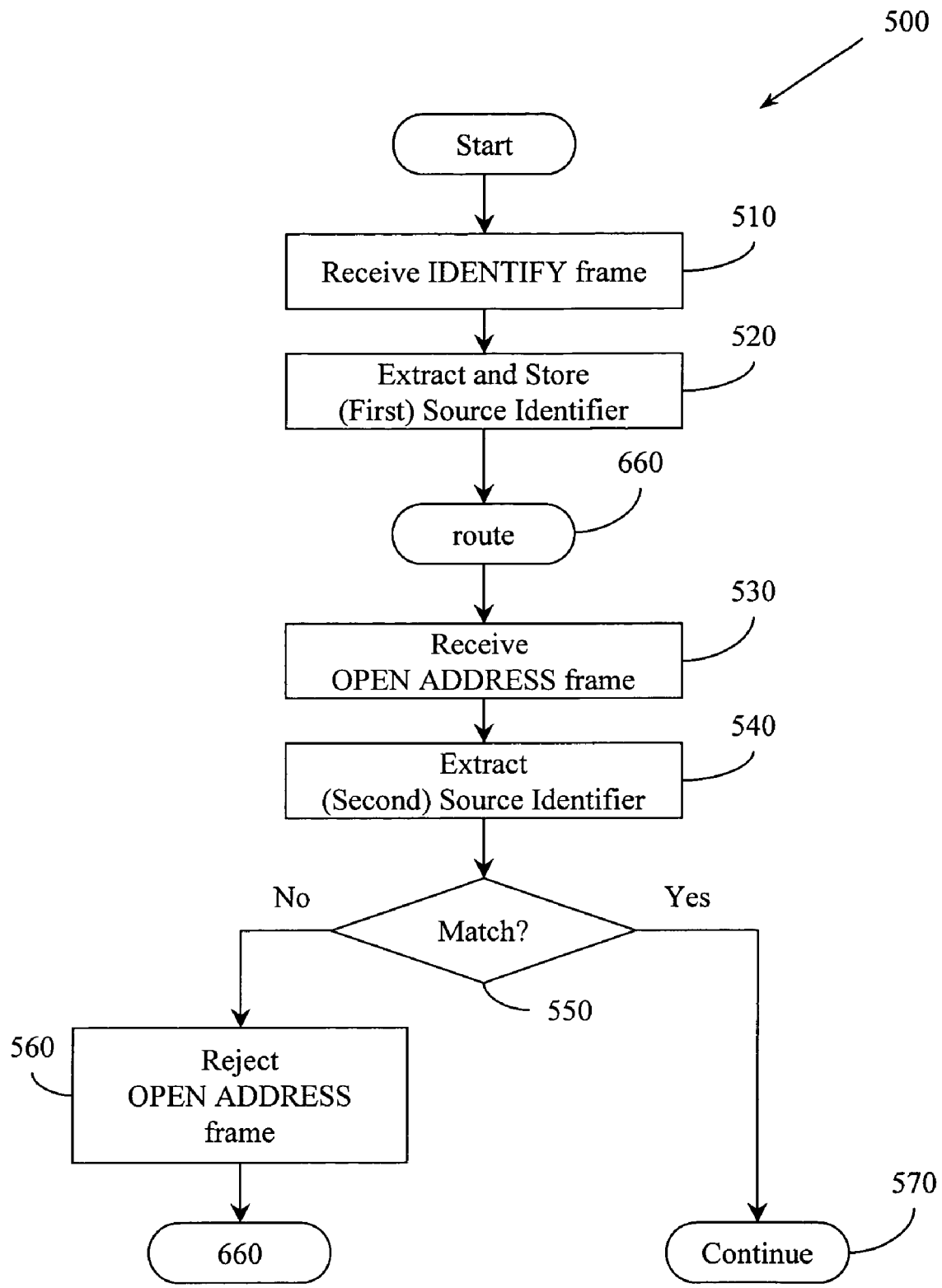
FIG. 5 illustrates a route process flow.
Figure 6:
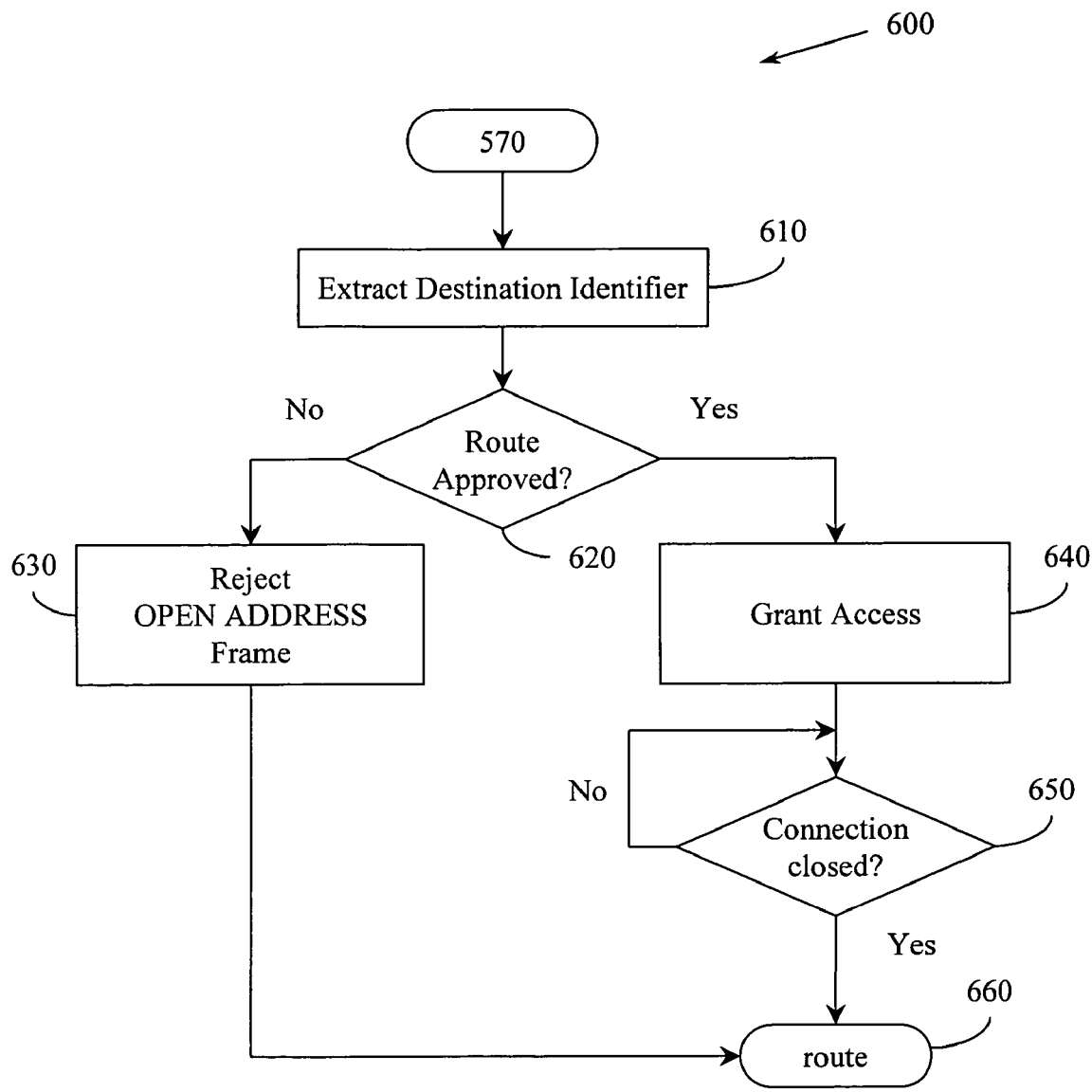
FIG. 6 illustrates another route process flow.

Example methods may be better appreciated with reference to flow diagrams of FIGS. 5 and 6. While for purposes of simplicity of explanation, the illustrated methodologies are shown and described as a series of blocks, it is to be appreciated that the methodologies are not limited by the order of the blocks, as some blocks may occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits like an analog circuit, a digital signal processor circuit, an application specific integrated circuit (ASIC), or other logic device. The diagram of FIG. 5, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

FIG. 5 illustrates a method 500 that is performable in an SAS expander like those described above (e.g., 100, 200, 400). Method 500 may include, at 510, receiving an SAS IDENTIFY frame through a PHY on the SAS expander. This frame may be received at times including, for example, during SAS domain discovery, when a device is added to a domain, and so on.

Method 500 may also include, at 520, extracting a first source identifier from the SAS IDENTIFY frame and storing the first source identifier in a comparison register associated with the PHY. While a comparison register is described, it is to be appreciated that the first source identifier may be stored in other locations. Similarly, while an IDENTIFY frame and an OPEN ADDRESS frame are described, it is to be appreciated that other communications may be involved in source identifier checking.

Method 500 may also include a re-entry point 660 that is available for setting up a new connection route. By way of illustration of the use of the re-entry point, at power-on—when an SAS link is established, an IDENTIFY frame is exchanged, conveying the identity of an attached device, one to the other. This happens once. At this point the link is established but not busy. A connection is made when an OPEN ADDRESS FRAME (OAF) is received and is accepted. Later the connection may be closed. A new OAF may be received and checked against the original IDENTIFY. This happens when an open is received. The re-entry point associated with this processing is block 660 "route". Thus, it is to be appreciated that SAS links may be shared, connections may be made, transactions may occur, and then the connection may be closed. Then a new device can open, connect, transact and close.

Method 500 may also include, at 530, receiving an SAS OAF through the same PHY through which the IDENTIFY frame was received. Method 500 may then include, at 540, extracting a second source identifier from the SAS OAF.

With the source identifiers from both the IDENTIFY frame and the OAF available, a comparison can be made. Thus, method 500 may include, at 550, determining whether the two source identifiers match. If they do not match, then method 500 may, at 560, selectively reject the SAS OAF. Rejecting the frame means that the frame may not be passed on to a device(s) attached to the SAS expander performing method 500. Thus, "rejected" is used to indicate a mechanism to deny the route request. A mismatch between source identifiers may indicate, for example, that someone is trying to gain unauthorized access to a device. Therefore, method 500 may also include, not illustrated, generating an asynchronous event notification concerning the source identifier mismatch.

While FIG. 5 illustrates various actions occurring in serial, it is to be appreciated that various actions illustrated in FIG. 5 could occur substantially in parallel. By way of illustration, a first process could receive messages, a second process could extract source identifiers from messages, and a third process could compare source identifiers. While three processes are described, it is to be appreciated that a greater and/or lesser number of processes could be employed and that lightweight processes, regular processes, threads, and other approaches could be employed.

FIG. 6 illustrates a method 600 that may also be performed in an SAS expander in addition to method 500. In different examples method 600 may be performed in serial with method 500 or substantially in parallel with method 500. Method 600 may pick up from block 570 of method 500. Thus, method 600 may include, at 610, extracting a destination identifier from the SAS OAF. With a source identifier and destination identifier available, explicit route checking may be performed. For example, a routing table and/or a routing rule may be consulted to determine whether the SAS expander performing method 600 will grant or deny access between the source and the destination.

If the determination at 620 is No, then method 600 may include, at 630, selectively rejecting the SAS OAF. The rejecting may be based, at least in part, on whether a route data associated with the SAS expander indicates that communications between a source device having the second source identifier and a destination device having the destination identifier are approved. If the determination at 620 is Yes, then method 600 may include, at 640, granting access to the destination.

In one example, methods 500 and 600 may be selectively applied to communications received at an SAS expander. For example, methods 500 and 600 may selectively perform their source identifier checking and explicit route checking functions for communications received from a PHY in a first category and/or zone and not perform the source identifier checking and the explicit route checking for communications received from a PHY in a second category and/or zone.

Like method 500, method 600 may also be configured to produce an asynchronous event notification upon selectively dropping the SAS OAF at 630. Furthermore, method 600 may be configured to perform additional processing upon granting access. For example, if the route is approved and access is granted at 640, then method 600 may also include, (not illustrated), selectively exposing all devices in a route between the source device and the destination device. Method 600 may include, at 650, waiting for the connection to close before proceeding to re-entry point 660.

Figure 7:
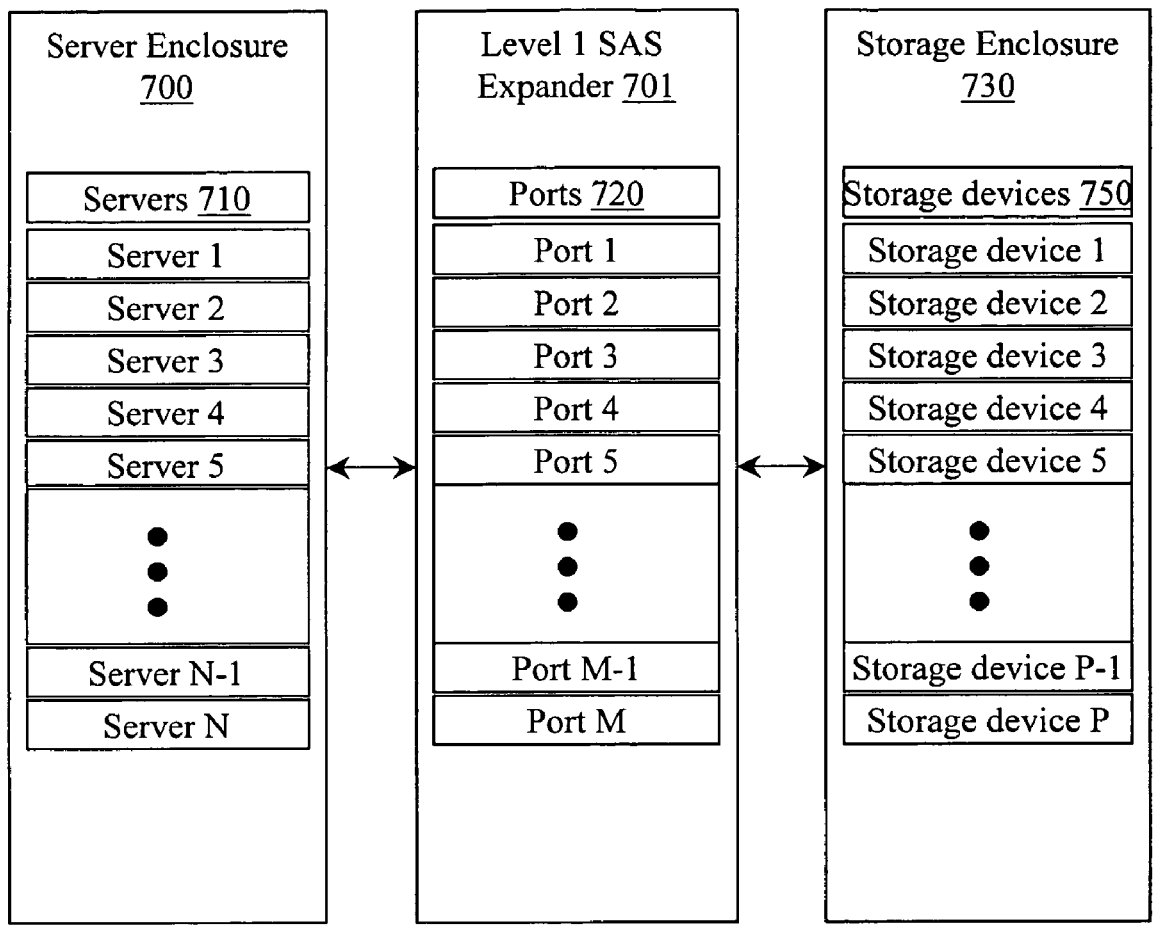
FIG. 7 illustrates a set of servers connected to a set of storage devices through an SAS expander.

FIG. 7 illustrates a simple configuration where a set of servers 710 are connected through a set of ports 720 provided by an SAS expander 701 to a set of storage devices 750 aggregated in a storage enclosure 730. In the simple configuration illustrated in FIG. 7, there is one level of SAS expander. SAS expander 701 may facilitate connecting members of the set of servers 710 through members of the set of ports 720 to the storage enclosure 730. Storage enclosure 730 may include the set of storage devices 750. The set of storage devices 750 may be shared between members of the set of servers 710. Members of the set of servers 710 may be associated with different operating systems. However, they may all seek to access the storage devices 750 in storage enclosure 730. While storage devices 750 are described, it is to be appreciated that the storage devices may be SAS devices and thus may not be limited to being just storage controllers and disk drives. The storage device may be, for example, a disk drive, a storage controller, and so on, some of which should be logically isolated from each other, logically kept "off-limits" for some operating systems, and the like. SAS Expander 701 may, therefore, be configured to provide VLAN-like mechanisms to prevent, for example, certain operating systems associated with members of the set of servers 710 from sharing and/or accessing certain storage devices stored in the set of storage devices 750. If there are multiple expanders and multiple groupings in a compound configuration like that illustrated in FIG. 8, management may be performed at a second level expander.

Figure 8:
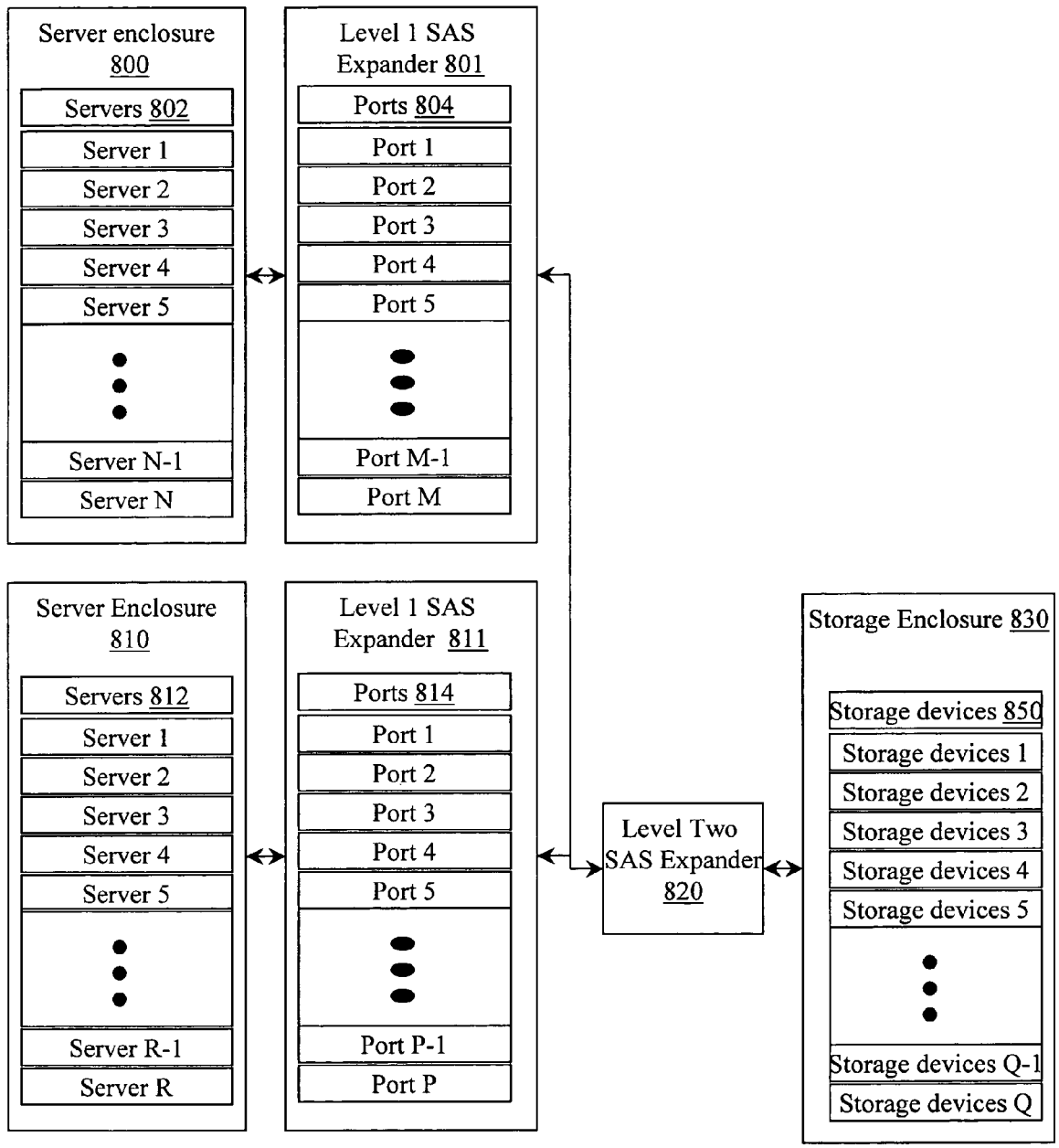
FIG. 8 illustrates multiple sets of servers connected to a set of storage devices through a series of SAS expanders.

In FIG. 8, a first SAS expander 801 provides ports 804 through which servers 802 in a server enclosure 800 may access a storage enclosure 830 via a second level SAS expander 820. Similarly, a second SAS expander 811 provides ports 814 through which servers 812 in a server enclosure 810 can access storage enclosure 830. Storage enclosure 830 may include, for example, a set of SAS devices (e.g., storage devices) 850. While FIG. 7 illustrates one level of SAS expander and FIG. 8 illustrates two levels of SAS expanders, it is to be appreciated that an SAS domain may include greater and/or lesser levels of SAS expanders.

Figure 9:
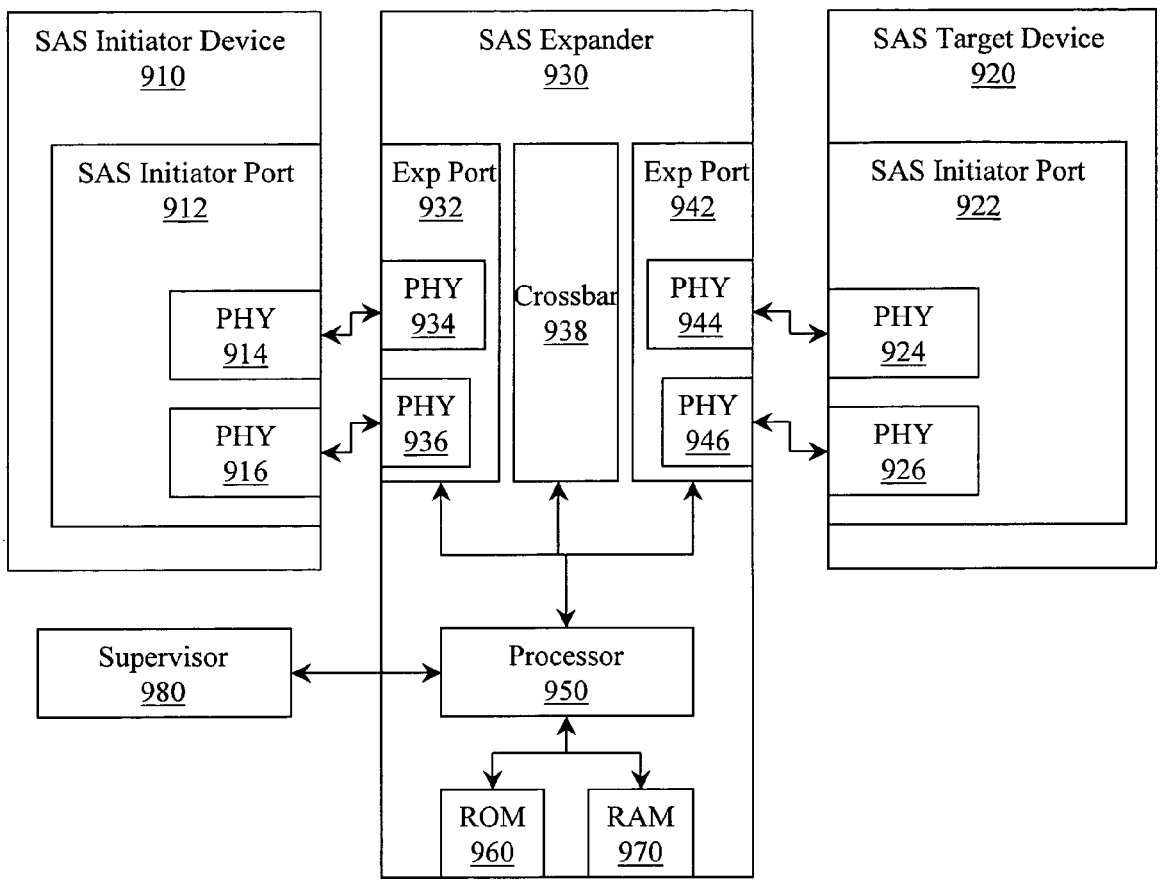
FIG. 9 illustrates pathways and connections in a system that includes an SAS expander.

FIG. 9 illustrates an example SAS expander 930 and paths and connections between SAS devices. SAS expander 930 may provide means (e.g., hardware, software) for selectively performing source identifier checking for received frames. The frames may be received, for example, from an SAS initiator device 910. Additionally, SAS expander 930 may provide means (e.g., hardware, software) for selectively performing explicit route checking for received frames. Furthermore, SAS expander 930 may provide means (e.g., hardware, software) for selectively providing VLAN-like services to devices connected to SAS expander 930.

SAS expander 930 may include expander ports 932 and 942. The expander ports may include PHYs (e.g., 934, 936, 944, 946) that may be employed to establish connections between an SAS initiator device 910 and an SAS target device 920. For example, SAS initiator device 910 may have a port 912 that includes PHYs 914 and 916. Connections may be made through PHYs 914 and 916 to an SAS target device 920 that includes a port 922 that includes PHYs 924 and 926.

As described above, an SAS expander can provide means for selectively providing source identifier checking, explicit route checking, and VLAN-like services. Thus, in one example, SAS expander 930 may include a processor 950 that is operably connected to ports 932 and 942 and crossbar 938 and also to a ROM 960 and a RAM 970. ROM 960 and RAM 970 may store data like routing tables, routing rules, and the like. Additionally, SAS expander 930 may be operably connected to a trusted supervisor 980 that may participate in manipulating the routing table, routing rules, and so on. An SAS expander may be located in an enclosure. The enclosure may have a management processor. Thus, in one example, the management processor may be configured as trusted supervisor 980.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A serial attached SCSI (SAS) expander, comprising:
   memory configured to store a static data for route checking and a dynamic data for explicit route checking;
   an SAS expander port comprising one or more PHYs that can be logically configured into one of two or more PHY categories;
   a source identifier logic configured to selectively prevent communications from passing through the SAS expander based, at least in part, on a source identifier validation, and on the PHY category of the SAS expander port PHY; and
   a route checking logic configured to receive from an initiator device a request for access to a target device and to selectively deny the initiator device access to the target device through the SAS expander port based, at least in part, on evaluating a route from the initiator device to the target device in light of the static data, the dynamic data, and the PHY category of the SAS expander port PHY.

2. A serial attached SCSI (SAS) expander, comprising:
   a read only memory (ROM) configured to store a static data configured to facilitate explicit route checking;
   a random access memory (RAM) configured to store a dynamic data configured to facilitate explicit route checking;
   an SAS expander port configured to communicate with one or more of, an SAS initiator port, an SAS target port, and another SAS expander port through an SAS connector and an SAS cable using one or more of, a serial SCSI protocol (SSP), a serial ATA tunneling protocol (STP), and a SCSI management protocol (SMP), the SAS expander port comprising one or more PHYs that can be logically configured into one of two or more PHY categories;
   a comparator logic configured to store a first unique source identifier presented to the SAS expander in a first communication and to selectively prevent a second communication from passing through the SAS expander based, at least in part, on whether a second unique identifier provided in the second communication matches the stored first unique source identifier and on a PHY category of the SAS expander port PHY; and
   an expander function logic operably connected to the ROM, the RAM, the comparator logic, and the SAS expander port, the expander function logic being configured to receive from an initiator device a request for access to a target device, the request including a source identifier associated with the initiator device and a destination identifier associated with the target device, and to selectively deny the initiator device access to the target device through the SAS expander port based, at least in part, on evaluating a route from the initiator device to the target device in light of the static data and the dynamic data and on a PHY category of the SAS expander port PHY.

3. The SAS expander of claim 2, the static data describing one or more of, a routing rule, and a pre-configured path, the dynamic data describing one or more of, a routing rule, and a routing table.

4. The SAS expander of claim 3, the routing table being configurable only by the SAS expander, the SAS expander being configured to only discover attached expanders and non-end devices.

5. The SAS expander of claim 4, the expander function logic being further configured to expose all devices in a route from the initiator device to the target device upon granting the initiator device access to the destination device.

6. The SAS expander of claim 3, the routing table being configurable by one or more of, the SAS expander, and a trusted supervisor operably connected to the SAS expander through a pre-determined, trusted PHY.

7. The SAS expander of claim 2, including a serial management protocol target port operably connected to the expander function logic and a serial enclosure service target port operably connected to the expander function logic, access to the serial management protocol target port and the serial enclosure service target port being controllable, at least in part, by the expander function logic.

8. The SAS expander of claim 2, the expander function logic comprising a microprocessor and software running on the microprocessor.

9. The SAS expander of claim 2, the source identifier, the destination identifier, the first unique source identifier, and the second unique source identifier being SAS world wide names, the first communication being an SAS IDENTIFY frame, and the second communication being an SAS OPEN ADDRESS frame.

10. The SAS expander of claim 2, the expander function logic being configured to selectively apply one or more rules to the request upon detecting that a field in the request matches a pre-defined value, the rules being configured to control access to the target device by the initiator device.

11. The SAS expander of claim 10, the one or more rules including port zoning rules.

12. The SAS expander of claim 11, the field being byte twenty in an OPEN ADDRESS frame.

13. The SAS expander of claim 2, the expander function logic and the comparator logic being configured to selectively perform one or more of, explicit route checking, management command sanitizing, and source identifier checking based, at least in part, on whether a communication is received through a PHY configured as a pre-defined logical type.

14. The SAS expander of claim 2, where the operation of the expander function logic and the comparator logic is controlled based, at least in part, on one or more of, a map of associations between devices and PHYs, a communication marking, and a relationship between a port and a zone.

15. The SAS expander of claim 2, where explicit route checking is performed at one or more of, a first SAS expander upstream from an initiator device, and a last SAS expander before a target device.

16. The SAS expander of claim 2, the SAS expander being located in an enclosure, the enclosure having a management processor configured as a trusted supervisor.

17. A serial attached SCSI (SAS) expander, comprising:
a read only memory (ROM) configured to store a static data configured to facilitate explicit route checking, the static data describing a routing rule and a pre-configured path;
a random access memory (RAM) configured to store a dynamic data configured to facilitate explicit route checking, the dynamic data describing a routing rule and a routing table, the routing table being configurable by the SAS expander, and a trusted supervisor operably connected to the SAS expander by a pre-determined, trusted PHY;
an SAS expander port configured to communicate with an SAS initiator port, an SAS target port, and another SAS expander port through an SAS connector and an SAS cable using a serial SCSI protocol (SSP), a serial ATA tunneling protocol (STP), and a SCSI management protocol (SMP), the SAS expander port comprising one or more PHYs that can be logically configured into one of two or more PHY categories;
a comparator logic configured to store a first unique source identifier presented to the SAS expander in a first communication and to selectively prevent a second communication from passing through the SAS expander based, at least in part, on whether a second unique identifier provided in the second communication matches the stored first unique source identifier;
an expander function logic operably connected to the ROM, the RAM, the comparator logic, and the SAS expander port, the expander function logic being configured to receive from an initiator device a request for access to a target device, the request including a source identifier associated with the initiator device and a destination identifier associated with the target device, and to selectively deny the initiator device access to the target device through the SAS expander port based, at least in part, on evaluating a route from the initiator device to the target device in light of the static data and the dynamic data, the source identifier, the destination identifier, the first unique source identifier, and the second unique source identifier being SAS world wide names, the first communication being an SAS IDENTIFY frame, and the second communication being an SAS OPEN ADDRESS frame;
a serial management protocol target port operably connected to the expander function logic; and
a serial enclosure service target port operably connected to the expander function logic, access to the serial management protocol target port and the serial enclosure services target port being controllable, at least in part, by the expander function logic,
the expander function logic and the comparator logic being configured to selectively perform one or more of, explicit route checking, management command sanitizing, and source identifier checking based, at least in part, on whether a communication is received through a PHY configured as one of the two or more logical PHY categories.

18. A method performable in an SAS expander, comprising:
configuring a PHY on the SAS expander to be in one of two logical PHY categories:
receiving an SAS IDENTIFY frame through the PHY on the SAS expander;
extracting a first source identifier from the SAS IDENTIFY frame;
storing the first source identifier in a comparison register associated with the PHY;
receiving an SAS OPEN ADDRESS frame through the PHY;
extracting a second source identifier from the SAS OPEN ADDRESS frame; and
selectively rejecting the SAS OPEN ADDRESS frame based, at least in part, on whether the first source identifier matches the second source identifier and on the logical PHY category of the SAS expander PHY.

19. The method of claim 18, including:
extracting a destination identifier from the SAS OPEN ADDRESS frame; and
selectively rejecting the SAS OPEN ADDRESS frame based, at least in part, on whether a route data associated with the SAS expander indicates that communications between a source device having the second source identifier and a destination device having the destination identifier are approved.

20. The method of claim 19, including:
upon determining that communications between the source device and the destination device are approved, selectively exposing to the source device all devices in a route between the source device and the destination device.

21. The method of claim 20, including selectively performing source identifier checking and explicit route checking for communications received from a PHY in a first category and not performing the source identifier checking and the explicit route checking for communications received from a PHY in a second category.

22. The method of claim 21, including:
generating an asynchronous event upon selectively dropping the SAS OPEN ADDRESS frame.

23. The method of claim 21, including:
selectively performing explicit route checking based, at least in part, on a routing attribute associated with an SAS expander PHY.

* * * * *

UNITED STATES PATENT AND TRADEMARK OFFICE
CERTIFICATE OF CORRECTION

PATENT NO.        : 7,644,168 B2
APPLICATION NO.   : 11/180145
DATED             : January 5, 2010
INVENTOR(S)       : Thomas W. Grieff et al.

It is certified that error appears in the above-identified patent and that said Letters Patent is hereby corrected as shown below:

In column 18, line 21, in Claim 18, delete "categories:" and insert -- categories; --, therefor.

Signed and Sealed this

Thirtieth Day of March, 2010

David J. Kappos
*Director of the United States Patent and Trademark Office*